United States Patent [19]
Ponziani

[11] Patent Number: 4,851,745
[45] Date of Patent: Jul. 25, 1989

[54] WINDSHIELD WASHER/WIPER APPARATUS

[75] Inventor: Richard L. Ponziani, Dayton, Ohio

[73] Assignee: General Motors Corporation, Detroit, Mich.

[21] Appl. No.: 156,799

[22] Filed: Feb. 17, 1988

[51] Int. Cl.[4] ............................................... B60S 1/08
[52] U.S. Cl. .............................. 318/443; 318/DIG. 2
[58] Field of Search ............... 318/443, 444, 452, 484, 318/DIG. 2

[56] References Cited

U.S. PATENT DOCUMENTS

| | | | |
|---|---|---|---|
| 3,351,836 | 11/1967 | Kearns | 318/443 |
| 3,483,584 | 12/1969 | Patterson | 15/250.02 |
| 3,581,178 | 5/1971 | Kearns | 318/443 |
| 3,582,747 | 6/1971 | Kearns | 318/443 X |
| 4,317,073 | 2/1982 | Blaszkowski | 318/483 |
| 4,339,698 | 7/1982 | Kearns | 318/DIG. 2 X |
| 4,422,024 | 12/1983 | Itoh et al. | 318/DIG. 2 |
| 4,544,870 | 10/1985 | Kearns et al. | 318/DIG. 2 X |
| 4,547,716 | 10/1985 | Johnson et al. | 318/DIG. 2 X |

Primary Examiner—Bentsu Ro
Attorney, Agent, or Firm—Robert M. Sigler

[57] ABSTRACT

In a vehicle windshield washer and wiper apparatus, the closure of a washer switch activates the washer and wiper and charges a capacitor to a first voltage. When the washer switch is released, the washer is deactivated but the wiper is activated through several more wipe cycles while the capacitor is discharging to a second voltage. The final wipe cycle and wiper parking is to be controlled by a wiper position responsive switch which is closed throughout the wipe pattern except for a speed predetermined angle, the beginning of which defines a desired park position. The improvement of the invention establishes the major discharge path for the capacitor through the wiper position responsive switch to greatly decrease the chance of the capacitor reaching the second voltage while the wiper position responsive switch is open and thereby more consistently park the wiper under the control of the wiper responsive switch in the desired park position.

3 Claims, 1 Drawing Sheet

WINDSHIELD WASHER/WIPER APPARATUS

BACKGROUND OF THE INVENTION

This invention is an improved windshield washer/wiper apparatus for a motor vehicle of the type which is activated to apply cleaning fluid to the windshield and move a wiper across the windshield in a repeating wipe pattern in response to a washer switch and further activated to continue to move the wiper through several additional wipe cycles after cessation of cleaning fluid application to clear the cleaning fluid from the windshield and stop the wiper in a predetermined park position at the end of the last wipe cycle.

Windshield washer/wiper apparatus of the prior art is known in which an electric washer apparatus is activatable by a washer switch to apply a cleaning fluid to the windshield and an electric wiper drive apparatus is activatable by the washer switch to drive a wiper across a vehicle windshield in a repeating wiper pattern. A wiper position responsive switch is activated by the wiper drive apparatus to open only through a predetermined wipe angle of the wiper within the wipe pattern and close through out the remainder of the wipe pattern. The electric wiper drive apparatus is responsive to the position responsive switch to continue driving the wiper through the wipe pattern while the position responsive switch is closed and, when not otherwise activated, to deactivate and park the wiper in a predetermined park position within the predetermined wipe angle when the position responsive switch opens.

The additional cycles may be provided by charge storage means such as a capacitor charged to a first predetermined voltage when the electric washer apparatus is activated and thereafter allowed to slowly discharge through a resistance while maintaining the electric wiper drive apparatus activated until a lower, second predetermined voltage is reached. As long as the position responsive switch is closed at that point, the cycle will be completed until the position responsive switch opens, deactivates the electric wiper drive means and parks the wiper in the predetermined park position.

However, the voltage on the capacitor in the prior art apparatus may reach the second predetermined voltage while the wiper is in the predetermined wipe angle and the position responsive switch is thus open. If this is the case, the wiper may be parked at a different position within the predetermined wipe angle from the desired predetermined park position, since the position at which the wiper is parked will not be controlled by the opening of the position responsive switch. The resulting occasional inconsistency in wiper parking may be noticeable to the vehicle driver and/or others.

SUMMARY OF THE INVENTION

It is thus an object of this invention to provide a windshield wiper and washer apparatus of the type described above with improved consistency in parking the wiper in the predetermined park position after windshield washing.

This is accomplished by discharge circuit means establishing a discharge path for the charge storage means through the wiper position responsive switch which comprises at least the major discharge path for the charge storage means, whereby the voltage on the charge storage means is more likely to fall below the second predetermined voltage while the wiper position responsive switch is closed, the deactivation of the electric wiper drive means is controlled more consistently by the opening of the position responsive switch, and the chance of the electric wiper drive apparatus being parked in other than the predetermined park position is greatly reduced. Further details and advantages of this invention will be apparent from the accompanying drawings and following description of a preferred embodiment.

DESCRIPTION OF THE PREFERRED EMBODIMENT

Figure 1:
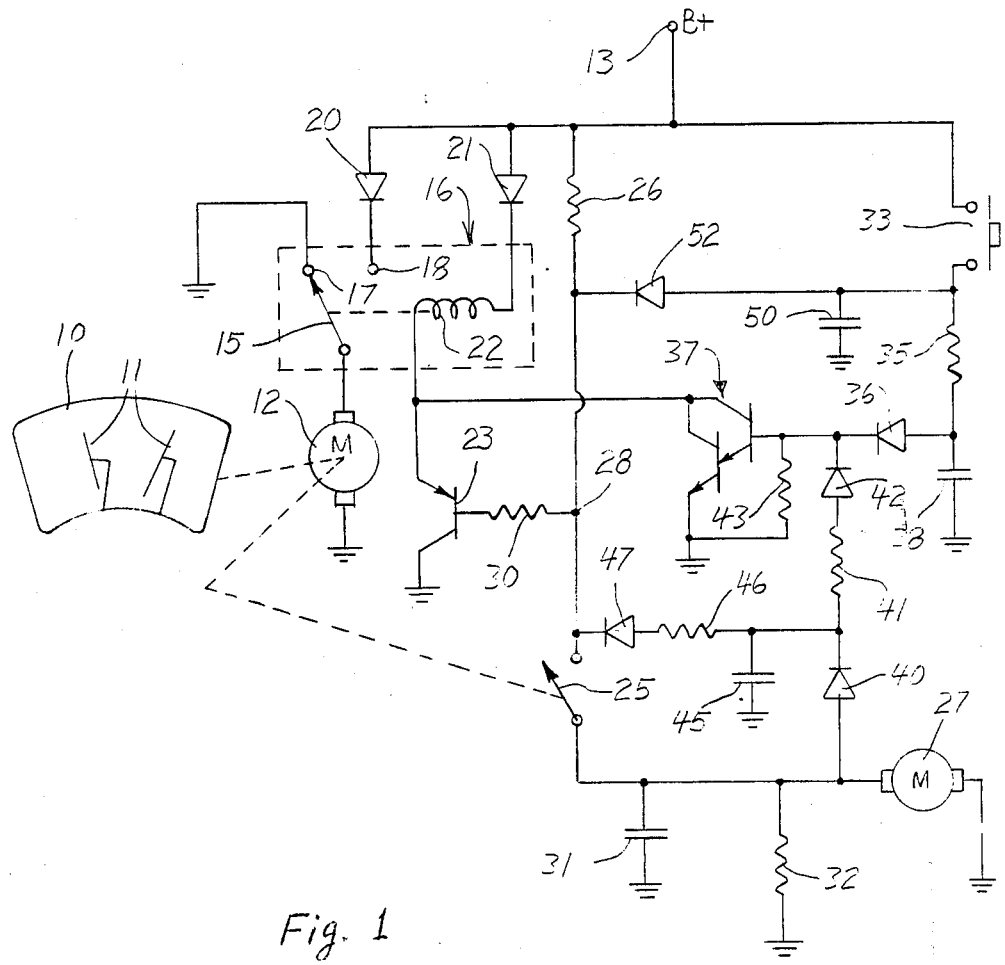
FIG. 1 shows a schematic and circuit diagram of a windshield wiper and washer apparatus according to the invention.

Referring to FIG. 1, a motor vehicle includes a windshield 10 with one or more wipers 11 driven by an electric wiper drive apparatus comprising an electric motor 12 and standard mechanical drive apparatus, not shown, through a wipe pattern across the windshield 10. An electric power source such as the usual vehicle battery and alternator system provides electric power at a voltage B+ (12–16 volts) between a terminal 13 and ground. Motor 12 has one armature terminal grounded and the other connected to the armature 15 of a relay 16 having a normally closed stationary contact 17 grounded and a normally open stationary contact 18 connected to receive current from terminal 13 through a diode 20. Terminal 13 may also provide current through a diode 21 and activating coil 22 of relay 16 to the emitter of a PNP transistor 23 having a grounded collector and a base.

A wiper position responsive switch 25 is controlled by the wiper drive apparatus to be closed during most of the wipe pattern of wipers 11 and open through a small predetermined wipe angle within the wiper pattern. Switch 25 is connected between a resistor 26 (47K) and a washer motor 27 from terminal 13 to ground across the electric power source of voltage B+. The junction 28 of switch 25 and resistor 26 is connected through a resistor 30 (56K) to the base of transistor 23. A capacitor 31 (0.001 $\mu$F) and resistor 32 (100) in parallel therewith are connected across washer motor 27. Washer motor 27 is the activating drive of washer apparatus including a motor driven pump and fluid storage tank effective, when motor 27 is activated, to apply cleaning fluid to windshield 11. However, the resistance of resistor 26 is large enough, compared to the effective combined resistance of resistor 32 and the armature of motor 27, that closure of wiper position responsive switch 25 does not activate motor 27 for windshield washing but, rather, renders transistor 23 conducting as long as switch 25 is closed. The activation of transistor 23 to a conducting state causes activation of relay 16 to connect motor 12 across the electric power source of voltage B+, whereby the wiper drive apparatus is activated and the wipers 11 are driven through their wipe pattern. When switch 25 opens, providing transistor 23 is not otherwise maintained in a conducting state, relay 16 opens and motor 12 is stopped with dynamic braking through contact 17 to immediately stop wipers 11 in a predetermined park position within the predetermined wipe angle in which switch 25 is open.

A washer switch 33 is normally open but may be closed to connect terminal 13 through a resistor 35 (1K)

and diode 36 to the base of a Darlington NPN transistor 37 having a bias resistor 43 (402K) connected from its base to a grounded emitter and its collector connected through coil 22 of relay 16 to terminal 13. A capacitor 38 may be connected from the anode of diode 36 to ground. Washer switch 33 further connects terminal 13 to ground through a capacitor 50 (0.001 μF) and through a diode 52 to switch 25. Thus, closure of washer switch 33 renders transistor 37 conducting to activate relay 16 and motor 12, even if wiper position responsive switch 25 is open. Movement of motor 12 soon closes switch 25, whereupon motor 27 is activated, assuming washer switch 33 is still closed. The closure of switch 25 provides an activating circuit for washer motor 27 through switch 33, diode 52 and switch 25 to cause application of cleaning fluid to the windshield and also maintains transistor 23 conducting to continue the activation of wiper motor 12. Thus, as long as washer switch 33 is held closed, the washer apparatus is activated to apply cleaning fluid to the windshield and the wiper drive apparatus is activated to drive wipers 11 through the wipe pattern and clean the windshield.

The junction of motor 27 and switch 25 is connected through a diode 40, resistor 41 (750K) and diode 42 in series to the base of transistor 37. The cathode of diode 40 is connected through charge storage means such as a capacitor 45 (33 μF) to ground and through a resistor 46 (75K, 1%) and diode 47 to junction 28. While washer switch 33 and wiper position responsive switch 25 are both closed, capacitor 45 quickly charges to a first predetermined voltage near B+.

When washer switch 33 is opened, washer motor 27 stops, since its only connection to terminal 13 is now through resistor 26; and the washer apparatus is thus deactivated. Transistor 37 is held on by the charge on capacitor 45, which provides a small base current to keep it conducting. Meanwhile, capacitor 45 is also discharging through resistor 46 and the armature of motor 27 as long as wiper position responsive switch 25 is closed. The discharge rate through the 75K resistor 46 is much greater than that through the much larger 750K resistor 41 in series with the base/emitter junction of transistor 37. Therefore, the major discharge path for capacitor 45 is through resistor 46, diode 47, switch 25 and the parallel combination of the armature of motor 27 and resistor 32. Thus capacitor 45 discharges mostly while switch 25 is closed and discharges very little through resistor 41 while switch 25 is open. Capacitor 45 loses an additional portion of its charge during the portion of each wipe cycle in which switch 25 is closed.

Thus, the voltage on capacitor 45 is much more likely to reach a second predetermine voltage, lower than the first, at which transistor 37 is biased off, while switch 25 is closed, whereupon switch 25 maintains transistor 23 conducting to finish the wipe cycle until switch 25 opens and the wipers 11 are parked in the predetermined park position as already described. Thus the deactivation of the electric wiper drive means is controlled more consistently by the opening of the position responsive switch, and the chance of the electric wiper drive apparatus being parked in other than the predetermined park position is greatly reduced compared with the apparatus of the prior art in which resistor 46 and diode 47 are not present to provide the major discharge path through wiper position responsive switch 25 and the capacitor corresponding to capacitor 45 discharges substantially through the transistor corresponding to transistor 37. It can be seen that, the greater the ratio of the resistance of resistor 41 to that or resistor 46, the smaller is the chance of the wiper being parked incorrectly after a wash. If resistor 41 were replaced by circuit apparatus which were capable of communicating a voltage thereacross but drew no current from capacitor 45, there would be no chance of the wiper being incorrectly parked. However, there is no indication that such an extreme measure is necessary. Preliminary demonstrations with the circuit as described have shown consistent wiper parking in the correct position.

The embodiments of the invention in which an exclusive property or privilege is claimed are defined as follows:

1. In a vehicle windshield washer and wiper apparatus having an electric washer apparatus activatable by a washer switch to apply a cleaning fluid to the windshield, an electric wiper drive apparatus activatable by the washer switch to drive a wiper across a vehicle windshield in a repeating wipe pattern, a wiper position responsive switch activated by the wiper drive apparatus to open only through a predetermined wipe angle of the wiper within the wipe pattern and close throughout the remainder of the wipe pattern, the electric wiper drive apparatus being responsive to the position responsive switch to continue driving the wiper through the wipe pattern while the position responsive switch is closed and, when not otherwise activated, to deactivate and park the wiper within the predetermined wipe angle when the position responsive switch is open, the wiper being parked in a predetermined park position when the position responsive switch opens with the electric wiper drive apparatus not activated, electric charge storage means, electric power circuit means activatable by the washer switch to charge the electric charge storage means to a first predetermined voltage when the electric washer apparatus is activated and thereafter establish a first discharge path for the charge storage means, the electric wiper drive apparatus being further activated in response to the charge storage means to continue driving the wiper through the wipe pattern as long as the voltage on the charge storage means exceeds a second predetermined voltage less than the first predetermined voltage and thus provide additional wipe cycles to clear the windshield of cleaning fluid, the improvement comprising:

discharge circuit means establishing an additional discharge path for the charge storage means through the wiper position responsive switch to increase the proportion of charge discharged while the position responsive switch is closed, the additional discharge path having a maximum impedance of one tenth the impedance of the first discharge path, whereby the voltage on the charge storage means is more likely to fall below the second predetermined voltage while the wiper position responsive switch is closed, the deactivation of the electric wiper drive apparatus is controlled more consistently by the opening of the position responsive switch, and the chance of the electric wiper drive apparatus being parked in other than the predetermined park position is greatly reduced.

2. The improved vehicle windshield washer and wiper apparatus of claim 1 in which:

the electric power circuit means comprises a source of electric power;

the electric wiper drive apparatus comprises an activating transistor having a base/emitter junction and being effective to activate the electric wiper drive apparatus when conducting;

the source of electric power is connected through the washer switch, the wiper position responsive switch, a first diode and additional circuit means to the base/emitter junction of the transistor, the additional circuit means being effective, when the washer switch and position responsive switch are simultaneously closed, to cause the transistor to conduct;

the first diode and the additional circuit means are connected in a first junction;

the electric charge storage means is a capacitor connected to the first junction to be charged to the first predetermined voltage through the first diode when the washer switch and wiper position responsive switch are closed simultaneously;

the washer switch and the wiper position responsive switch are connected in a second junction; and the first junction is connected through a first resistor and a second diode to the second junction so that, when the washer switch is open and the wiper position responsive switch closed, the capacitor discharges through the first resistor, the second diode and the wiper position responsive switch, the first resistor having a maximum resistance of one tenth the resistance of any discharge path established through the additional circuit means, and the first resistor and the additional circuit means comprising the only discharge paths for the capacitor, whereby at least the major discharge of the capacitor takes place when the wiper responsive switch is closed.

3. The improved vehicle windshield washer and wiper apparatus of claim 2 in which the additional circuit means comprises a second resistor and a third diode connected in series between the first junction and the base/emitter junction of the transistor, the second resistor having a resistance at least ten times that of the first resistor.

* * * * *